(12) United States Patent
Preller

(10) Patent No.: US 6,650,526 B2
(45) Date of Patent: Nov. 18, 2003

(54) DEMAGNETIZING CIRCUIT

(75) Inventor: Peter Preller, München (DE)

(73) Assignee: Micronas GmbH, Freiberg (DE)

( * ) Notice: Subject to any disclaimer, the term of this patent is extended or adjusted under 35 U.S.C. 154(b) by 388 days.

(21) Appl. No.: 09/816,765

(22) Filed: Mar. 23, 2001

(65) Prior Publication Data

US 2001/0026433 A1 Oct. 4, 2001

(30) Foreign Application Priority Data

Mar. 23, 2000 (DE) .......................................... 100 14 383

(51) Int. Cl.$^7$ .................................................. H01H 47/00
(52) U.S. Cl. ................................................................ 361/149
(58) Field of Search .............................. 361/139, 143, 361/146, 149, 150, 152

(56) References Cited

U.S. PATENT DOCUMENTS 4,153,858 A * 5/1979 Schylander ..................... 315/8
5,307,232 A * 4/1994 Manske ....................... 361/150
5,526,221 A * 6/1996 An .............................. 361/149

FOREIGN PATENT DOCUMENTS

| DE | AS 1 489 988 | 6/1969 | ........... H01F/13/00 |
| DE | 30 49 351 A1 | 9/1981 | ........... H01F/13/00 |
| EP | 0 265 614 | 5/1988 | ........... H04N/9/29 |

* cited by examiner

Primary Examiner—Ronald W. Leja
(74) Attorney, Agent, or Firm—Samuels, Gauthier & Stevens LLP

(57) ABSTRACT

For achieving a desired course in the demagnetizing circuit (I1) and power dissipation that is as low as possible during continuous operation of a color television set, a demagnetizing circuit for controlling the demagnetizing current (I1) includes two transistors (T1, T2) that are controlled via a common or via two separate capacitive voltage dividers (C1–C4). A rectified alternating voltage is applied to the capacitive voltage dividers (C1–C4). The demagnetizing current (I1) controlled by the transistors (T1, T2) is supplied to a demagnetizing coil (R4).

21 Claims, 3 Drawing Sheets

DEMAGNETIZING CIRCUIT

BACKGROUND OF THE INVENTION

The present invention relates to the field of demagnetizing circuits, and in particular to a demagnetizing circuit for demagnetizing color picture tubes.

Color picture tubes must be demagnetized in order to obtain sufficient color purity. For this reason, a demagnetizing coil is used through which a fading high-amplitude alternating current is sent when the equipment is turned on. However, the leakage current flowing through the demagnetizing coil during continuous operation should be as low as possible in order to reduce power dissipation.

In conventional demagnetizing circuits, a positive temperature coefficient (PTC) thermistor in series with the demagnetizing coil is employed for obtaining the decreasing amplitude in the alternating current. The PTC thermistor is a resistor with a resistance that is a function of temperature, wherein the resistance increases as the temperature increases. The resistance of the PTC thermistor is thus very low when the equipment is turned on, that is, when it is cold, but it is substantially higher when it is warmed up in the operating mode.

A problem with a PTC thermistor is that it suffers from the disadvantage that during continuous operation of the equipment, leakage current flowing through the demagnetizing coil and the PTC thermistor causes continuous power dissipation of approximately 2 W. This is particularly troubling in standby mode operation because the power consumption should be as low as possible in that mode of operation. Therefore, in expensive television sets the demagnetizing current, (i.e., the current flowing through the demagnetizing coil and the PTC thermistor) is turned off during continuous operation using an additional circuit (e.g., that includes a triac or optical coupling device).

Therefore, there is a need for a demagnetizing circuit in which the desired current flow can be achieved with a reduced complexity control circuit and without substantial power dissipation occurring during continuous operation.

SUMMARY OF THE INVENTION

Briefly, according to an aspect of the present invention, a demagnetizing circuit for controlling a demagnetizing current applied to a demagnetizing coil includes at least two transistors that are controlled by at least one capacitive voltage divider. A rectified alternating voltage is applied to the capacitive voltage divider, which applies control signals to the transistors to control the demagnetizing current supplied to the demagnetizing coil.

The demagnetizing circuit uses MOS or bipolar transistors rather than a PTC thermistor. Thus, with modest complexity in terms of the control, not only can a demagnetizing current with fading amplitude be produced, but the demagnetizing current returns to zero. As a result, after the demagnetizing no power dissipation occurs, which is particularly advantageous when the equipment is in standby mode.

The transistors are controlled via a capacitive circuit that may include a single capacitive voltage divider, or at least two separate capacitive voltage dividers. Ideally, the inverse diode generally present in MOS transistors is also used. When using bipolar transistors that are not equipped with such inverse diodes, discrete diodes must be provided.

In accordance with one exemplary embodiment of the present invention, the complexity of the control can be further reduced when the source and gate terminals for the two MOS transistors are connected to one another so that the demagnetizing circuit can be operated with just one capacitive voltage divider.

In another aspect of the present invention, a demagnetizing circuit may retroactively actuate or activate the demagnetizing even after the equipment has been turned on, so that demagnetizing can also be performed during continuous operation of the equipment. This is particularly desirable when the equipment remains powered up for an extended period and is merely switched to standby outside of operating times. In this embodiment, an additional transistor is used (e.g., a small-signal transistor) and a corresponding voltage must be applied to this additional transistor to switch this transistor to the conducting state to initiate the demagnetizing. For instance, this can occur with a voltage that is low in the equipment standby mode and is high in the operating mode.

The invention is particularly suitable for demagnetizing color picture tubes in television equipment. However, the invention is not restricted to this field of application; rather, it can be used in general whenever demagnetizing is to be performed using a demagnetizing coil.

These and other objects, features and advantages of the present invention will become more apparent in light of the following detailed description of preferred embodiments thereof, as illustrated in the accompanying drawings.

DETAILED DESCRIPTION OF THE INVENTION

Figure 1:
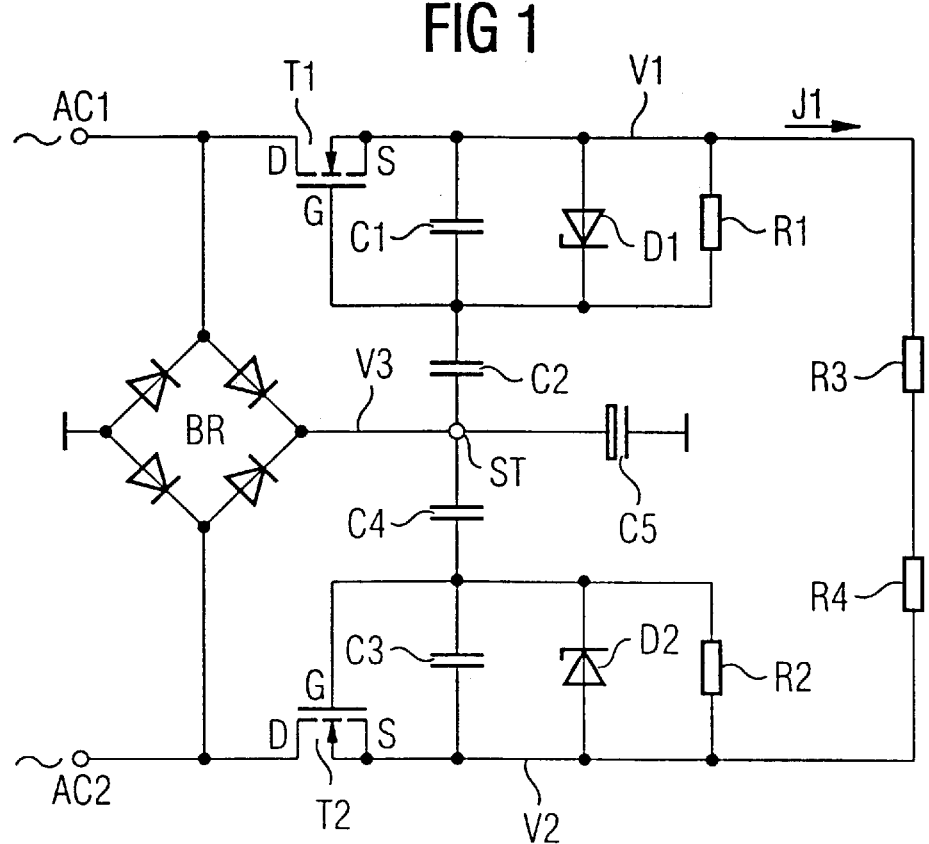
FIG. 1 is a schematic illustration of a demagnetizing circuit in accordance with a first exemplary embodiment of the present invention.

FIG. 1 is a schematic illustration of a demagnetizing circuit that includes two MOS transistors for controlling demagnetizing current. The demagnetizing circuit includes two terminals AC1 and AC2 for applying an alternating voltage. Interposed between the two terminals AC1 and AC2 is a series connection comprising a first MOS transistor T1, two resistors R3 and R4, and a second MOS transistor T2. The resistor R3 limits the current, while the resistor R4 corresponds to the ohmic equivalent resistance of a demagnetizing coil provided for demagnetizing. The drain terminals of the two transistors T1 and T2 are labeled D in FIG. 1, the source terminals are labeled S, and the gate terminals are labeled G.

The two transistors T1 and T2 are each controlled via a capacitive voltage divider C1, C2, and C3, C4, respectively. The capacitors C2 and C4 are each connected to a control terminal ST, while the capacitors C1 and C3 connect the gate terminals G and the source terminals S of the transistors T1 and T2. Clipper diodes D1 and D2 and discharge resistors R1 and R2 are connected parallel to capacitors C1 and C3, respectively.

Connected to the control terminal ST is the output of a bridge rectifier BR, the inputs of which are connected to the two terminals AC1 and AC2. The bridge rectifier BR ensures that only positive half-waves are applied to the control terminal ST. Also connected to the control terminal ST is an electrolyte capacitor C5, the other end of which is connected to a ground. This electrolyte capacitor C5 smoothes the voltage rectified by the bridge rectifier BR. Both the bridge rectifier BR and the electrolyte capacitor C5 are components of a power supply unit that is to be connected to the demagnetizing circuit, as illustrated in FIG. 1.

Figure 2:
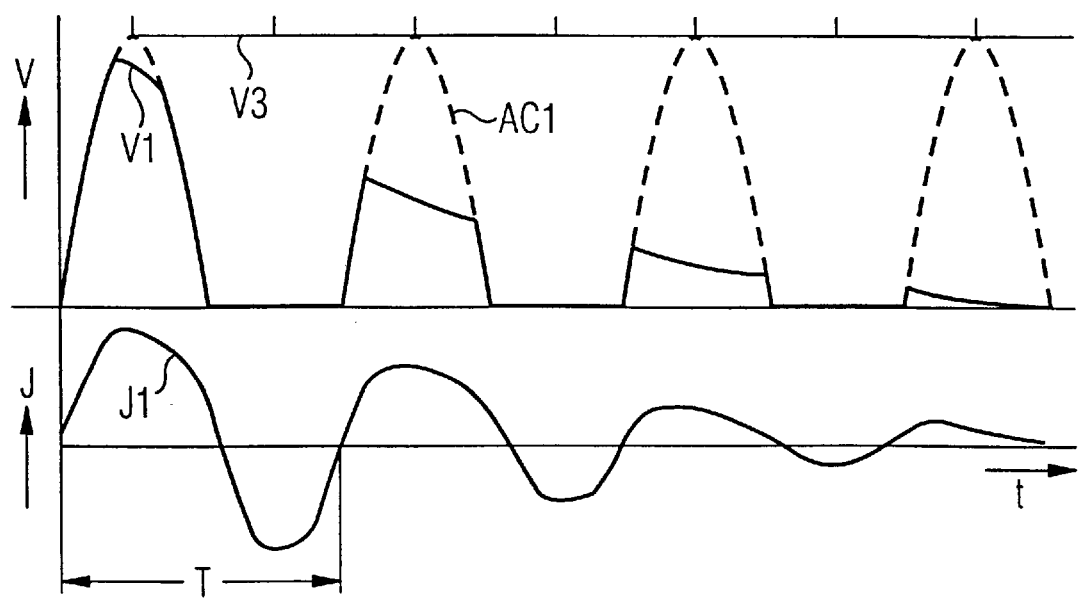
FIG. 2 illustrates a plot of various voltage potentials and the demagnetizing current, both as a function of time, for the circuit illustrated in FIG. 1.

The function of the demagnetizing circuit illustrated in FIG. 1 is explained in the following referring to FIG. 2 for the terminal AC1 and transistor T1. FIG. 2 illustrates a plot of the demagnetizing current I1 flowing through the demagnetizing coil R4 and the voltage potentials V1 and V3 with respect to the half-waves applied to terminal AC1 shown in FIG. 1.

When the power supply is on, the electrolyte capacitor C5 is charged to the peak value of the supply voltage. During the next zero crossing of the supply voltage, the transistor T1 is first conductive, since the gate terminal G of the transistor T1 is positively biased relative to the source terminal S by the capacitive voltage dividers C1 and C2 located between the source terminal S of the transistor T1 and the positive pole of the electrolytic capacitor C5. The gate/source voltage Vgs of the transistor T1 is Vgs=V3*C2/(C1+C2) (if the effect of the clipper diode D1 is ignored).

The clipper diode D1 protects against exceeding the permissible gate/source voltage and ensures that the transient characteristics remain constant regardless of the height of the current supply voltage, whereby the amplitude of the demagnetizing current is reduced from one half-wave to the other.

The values of the capacitors C1 and C2 should be such that the transistor T1 can be fully turned on even at the smallest supply voltage at which the equipment can run.

If the voltage applied to terminal AC1 rises to its peak value during a half wave, the gate/source voltage of the transistor T1 decreases since the voltage drops via the capacitive voltage dividers C1, C2. During the next maximum power, the voltage on the terminal AC1 reaches the value of the voltage potential V3 on the electrolyte capacitor C5, since V3 equals the peak value of the voltage applied to terminal AC1. In contrast, the voltage potential V1 does not quite reach the peak value, since the transistor T1 begins to block shortly before the peak value is achieved. The voltage V1 stabilizes at a value at which the transistor T1 just remains conductive. The demagnetizing current I1 flows in the forward direction through the current-conducting path of the transistor T1 and over the resistors R3 and R4, while the demagnetizing current flows in the reverse direction through the transistor T2 (through the integrated reverse-conducting inverse diode).

Once the peak value of the supply voltage is exceeded, the voltage applied to the terminal AC decreases again. Initially the voltage V1 largely retains its value, and not until the voltage applied to the terminal AC1 is less than the voltage V1 does the transistor T1 become completely conductive again and the voltage V1 drops with the voltage applied to the terminal AC1.

The process repeats itself with the next half wave, whereby in this case the process plays out with respect to the voltage applied to the terminal AC2 in the lower area of the circuit (i.e., in the components T2, C3 and C4, D2, and R2). The voltage applied to the terminal AC1 remains at zero, while the voltage applied to the terminal AC2 changes in accordance with a sinusoidal half wave.

These processes repeat themselves during the subsequent half waves, whereby however the capacitors C1 and C3 are gradually discharged through the resistors R1 and R2. The voltages V1 and V2 therefore increase less and less, so the demagnetizing current I1 flowing through the resistors R3 and R4 gradually decreases. In particular the voltages V1 and V2 and the demagnetizing current I1 decrease exponentially, as shown in FIG. 2 (only V1 is illustrated in FIG. 2), whereby the period T of the demagnetizing current I1 is 20 ms at 50 Hz supply voltage. In this manner, the desired course for the demagnetizing current I1 as described at the beginning is obtained using the demagnetizing circuit illustrated in FIG. 1.

Figure 3:
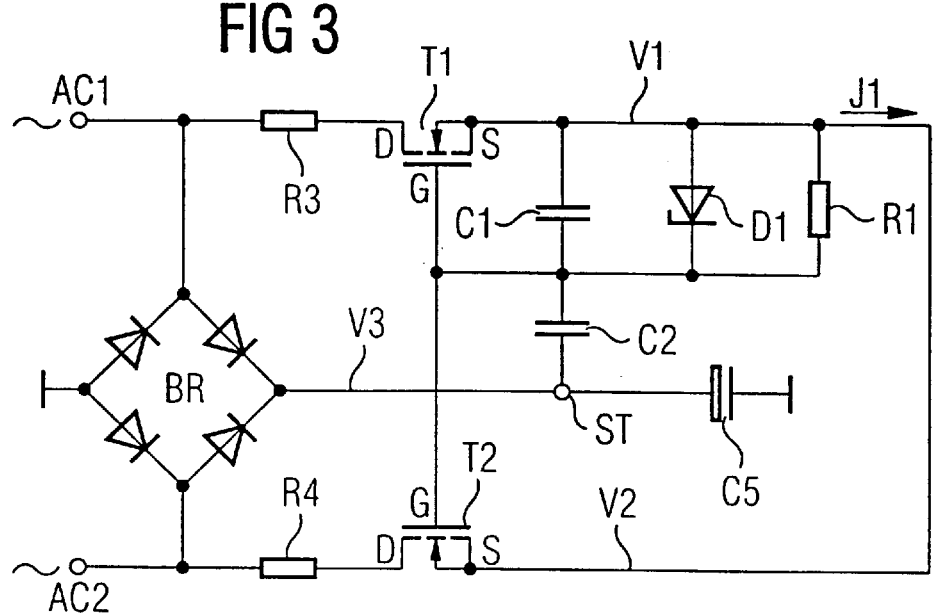
FIG. 3 is a schematic illustration of a demagnetizing circuit in accordance with a second exemplary embodiment of the present invention.

FIG. 3 illustrates a simplified exemplary embodiment of the present invention. The resistors in the electric circuit (i.e., the current-limiting resistor R3 and the ohmic resistance of the demagnetizing coil) are divided equally on the upper and lower parts of the circuit (R3=R4). The source and gate terminals of the two transistors T1 and T2 are connected to one another. A common capacitive voltage divider C1, C2 is provided for the two transistors T1 and T2 (with clipper diode D1 connected parallel to the capacitor C1 and with a parallel-connected discharge resistor R1), so that the complexity of the control circuit is half that of the exemplary embodiment illustrated in FIG. 1.

Figure 4:
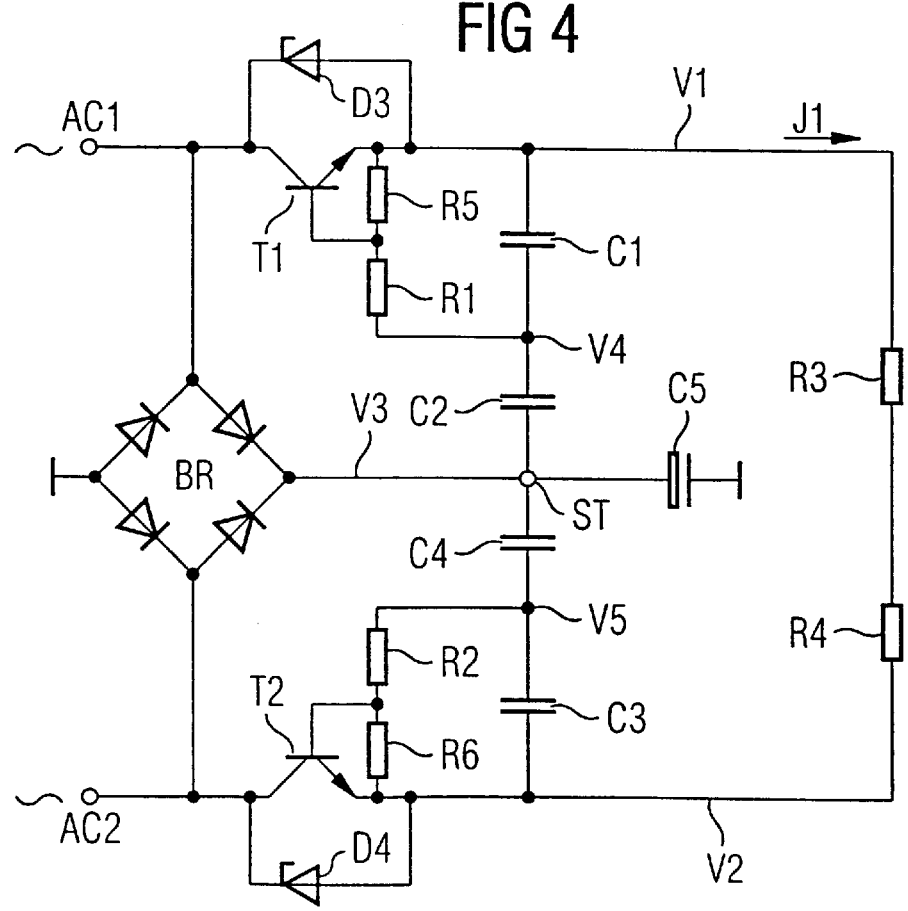
FIG. 4 is a schematic illustration of a demagnetizing circuit in accordance with a third exemplary embodiment of the present invention.

FIG. 4 illustrates an exemplary embodiment equivalent to the exemplary embodiment illustrated in FIG. 1, wherein bipolar transistors are used rather than MOS transistors. If the bipolar transistors do not already contain reverse-conducting inverse diodes like the MOS transistors, these must be additionally provided. Therefore, the embodiment illustrated in FIG. 4 includes additional diodes D3 and D4 associated with the bipolar transistors T1 and T2, respectively. Since bipolar transistors by nature have a limit in the base voltage, in contrast to FIG. 1 and FIG. 2 the limiting diodes D1 and D2 can be omitted, at least in a narrow region of the supply voltage. The additional resistors R5 and R6 included in the embodiment illustrated in FIG. 4 act as voltage dividers for the base voltage of the transistors T1 and T2.

Figure 5:
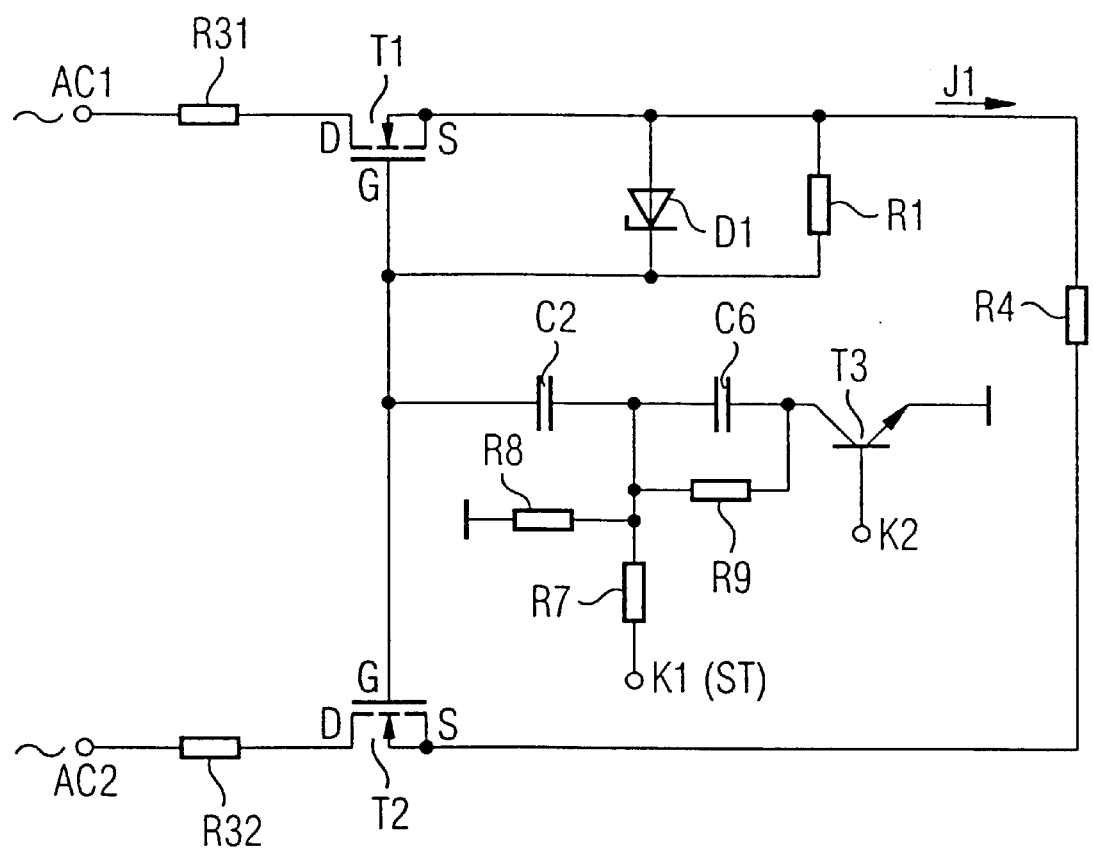
FIG. 5 is a schematic illustration of a demagnetizing circuit in accordance with a fourth exemplary embodiment of the present invention.

FIG. 5 illustrates a demagnetizing circuit that makes it possible to retroactively demagnetize, even after the supply voltage has been turned on. Thus, with this circuit it is possible to demagnetize even when the equipment is operating.

In the exemplary embodiment illustrated in FIG. 5, current-limiting resistors R31 and R32 are divided equally on the upper and lower part of the circuit. The gate terminals for the two transistors T1 and T2 are connected to one another as in FIG. 3. The electric circuit for the demagnetizing current I1 runs in a corresponding half wave from the first supply voltage terminal AC1 via the first current-limiting resistor R31, the first transistor T1, the demagnetizing coil and its ohmic resistor R4, the second transistor T2, and the second current-limiting resistor R32 to the second supply voltage terminal AC2. The current I1 flows in the reverse direction in the subsequent half wave.

Referring still to FIG. 5, the control member that ensures the exponential damping of the demagnetizing current I1 includes capacitor C2, discharge resistor R1, and clipper diode D1. In this embodiment, the capacitor C1 is not required since the gate/source capacitors of the two transistors T1 and T2 are formed by the parasitic input capacitors of these transistors.

For reasons of clarity, neither the bridge rectifier BR nor the electrolyte capacitor C5 are illustrated in FIG. 5. In this exemplary embodiment, terminal K1 acts as control terminal ST; the power supply is to be connected thereto with the connection point between the bridge rectifier BR and the electrolyte capacitor C5. In contrast to the preceding exemplary embodiments, the capacitor C2 is not connected directly to the electrolyte capacitor C5, but rather via an additional resistor R7.

The connection point for the resistor R7 to the capacitor C2 is connected to a ground via a series connection out of another capacitor C6 and the collector-emitter segment of another transistor T3. The transistor T3 is a small-signal transistor that must, however, be voltage-stable up to approximately 300 V. Connected parallel to the capacitor C6 is another discharge resistor R9, and resistor R8 is interposed between the connection point of the resistors R7, R9 and the ground.

The demagnetizing circuit illustrated in FIG. 5 functions as follows. In steady-state after the first demagnetizing (i.e., after the supply voltage has been turned on) the gate terminals G that are connected to one another and that are from the two MOS field effect transistors T1 and T2 discharge to the source potential so that the transistors T1 and T2 block and no more demagnetizing current I1 flows. The collector of the transistor T3 applies a voltage that is somewhat lower than the high voltage on the control terminal (i.e., on the terminal K1). The voltage is lowered by the voltage dividers formed from the resistors R7 and R8 and this ensures that the permissible collector voltage of the transistor T3 is not exceeded.

If at some later time additional demagnetizing must be performed, the transistor T3 is switched to the conducting state by applying a suitable voltage to the base terminal K2. Thus, in the embodiment of the transistor T3 illustrated in FIG. 5 wherein T3 is configured as an npn-transistor, a positive voltage must be applied to the terminal. This can occur, for example, by a voltage that is too low in the standby mode and is too high in the operating mode. A switched mode power supply control component such as TDA 16847 is particularly suitable for producing this voltage, since it has an output for power measurement at which a power-dependent voltage can be produced by simple wiring, but not a frequency or supply voltage-dependent voltage.

By turning on the transistor T3, its collector is pulled to the ground, whereby the resulting negative voltage jump is transmitted via the capacitor C6 so the voltage potential on the connection point of the capacitors C2 and C6 also drops almost to the ground potential (since the capacitors C2 and C6 are selected with C2<<C6, the voltage is only slightly capacitively divided). However, the voltage jump is also transmitted via the capacitor C2 to the gate terminals G of the two transistors T1 and T2. The gate terminals are held at ground potential by the diode D1. The capacitor C6 is charged relatively rapidly via the resistor R7 so that the voltage on the connection point of the capacitors C2 and C6 increases. This increase in voltage is transmitted by the capacitive voltage divider formed by the capacitor C2 and the parasitic gate capacitors of the transistors T1 and T2, to the gate terminals G of the two transistors. The limiting Zener diode D1 prevents the permissible gate voltage from being exceeded. The transistors T1 and T2 are now conductive and a demagnetizing process is initiated as described above.

The control circuit is re-set in preparation for another demagnetizing by turning the transistor T3 off again. The charged capacitor C6 is then gradually discharged through the resistance R9. Once the capacitor C6 is discharged, the circuit is again ready for a new demagnetizing process.

Although the present invention has been shown and described with respect to several preferred embodiments thereof, various changes, omissions and additions to the form and detail thereof, may be made therein, without departing from the spirit and scope of the invention.

What is claimed is:

1. A demagnetizing circuit, comprising:
   first and second supply voltage terminals that receive an alternating supply voltage;
   a demagnetizing coil arranged between said first and second supply voltage terminals;
   a first transistor and a second transistor are arranged between said first supply voltage terminal and said second supply voltage terminal; and
   a control terminal connected to said first transistor and to said second transistor for controlling said first and second transistors via capacitive circuit means and to which a rectified alternating supply voltage is applied.

2. The demagnetizing circuit of claim 1, wherein said capacitive circuit means comprises:
   a first capacitive voltage divider;
   a second capacitive voltage divider; and
   wherein said first transistor is arranged between said first supply voltage terminal and a first end of said first capacitive voltage divider, and a control voltage for said first transistor is picked up on said first capacitive voltage divider, whereby said second transistor is arranged between said second supply voltage terminal and a first end of said second capacitive voltage divider, and a control voltage for said second transistor is picked up on said second capacitive voltage divider, wherein said first capacitive voltage divider and said second capacitive voltage divider are connected at their second ends to said control terminal.

3. The demagnetizing circuit of claim 2, wherein each of said first and second transistors includes an associated first terminal and an associated second terminal that define a current-conducting path through each transistor, wherein said first and second transistors each includes an associated third terminal that controls the current flow through the current-conducting path for its associated transistors, and wherein said first capacitive voltage divider includes a capacitor (C1) connecting said third terminal and said second terminal of said first transistor and said second capacitive voltage divider includes a capacitor connecting said third terminal and said second terminal of said second transistor, whereby said first transistor is connected at its first terminal to said first supply voltage terminal and said second transistor is connected at its first terminal to said second supply voltage terminal.

4. The demagnetizing circuit of claim 3, wherein said first and second transistors are MOS transistors, whereby said first terminal constitutes the drain terminal, said second terminal constitutes the source terminal, and said third terminal constitutes the gate terminal of each said transistor.

5. The demagnetizing circuit of claim 3, wherein said first and second transistors are bipolar transistors, whereby said first terminal constitutes the collector, said second terminal constitutes the emitter, and said third terminal constitutes the base of each said transistor.

6. The demagnetizing circuit of claim 5, wherein a discharge path is arranged parallel to said capacitor of said first capacitive voltage divider, said capacitor connects said third terminal and said second terminal of said first transistor, and a discharge path is arranged parallel to said capacitor of said second capacitive voltage divider, which connects said third terminal and said second terminal of said second transistor.

7. The demagnetizing circuit of claim 1, wherein each of said first and second transistors includes a first terminal and a second terminal that define a current-conducting path through each transistor, and each furthermore includes a third terminal that controls the current flow through the current-conducting path of each said transistor, wherein said third terminals and said second terminals of said two transistors are connected to one another, and said first transistor is connected at its first terminal to said first supply voltage terminal, while said second transistor is connected at its first terminal to said second supply voltage terminal.

8. The demagnetizing circuit of claim 7, wherein said capacitive circuit means comprises a capacitive voltage divider that includes a capacitor connecting said third terminals and said second terminals of said first and second transistors.

9. The demagnetizing circuit of claim 8, comprising a discharge path arranged parallel to said capacitor of said capacitive voltage divider, wherein said capacitor connects said third terminals and said second terminals of said first and second transistors.

10. The demagnetizing circuit of claim 9, wherein said first and second transistors are MOS transistors, whereby said first terminal constitutes the drain terminal, said second terminal constitutes the source terminal, and said third terminal constitutes the gate terminal of each said transistor.

11. The demagnetizing circuit of claim 1, wherein said capacitive circuit means is coupled to a third transistor to which an actuating voltage is applied to perform a demagnetizing process.

12. The demagnetizing circuit of claim 11, wherein each of said first and second transistors has a first terminal and a second terminal that define a current-conducting path through each said transistor, and each of said first and second transistors includes a third terminal controlling the current flow through the current-conducting path for each transistor, whereby said third terminals of said two transistors are connected to one another and said first transistor is connected at its first terminal to said first supply voltage terminal, while said second transistor is connected at its first terminal to said second supply voltage terminal, wherein said third transistor includes a first terminal and a second terminal that define a current-conducting path through said third terminal and furthermore has a third terminal that controls the current flow through the current-conducting path of said third transistor, and furthermore characterized in that said capacitive circuit means are interposed between said third terminals of said first and second transistors and said first terminal of said third transistor and the actuation voltage for performing a demagnetizing process is applied to said third terminal of said third transistor.

13. The demagnetizing circuit of claim 12, wherein said third transistor is a small-signal transistor, the collector of which is connected to said third terminals of said first and second transistors and the emitter of which is connected to a ground, whereby the actuation voltage for performing a demagnetizing process is to be applied to said base of said third transistor.

14. The demagnetizing circuit of claim 13, wherein said collector of said third transistor is connected to said control terminal via a capacitor and a voltage divider.

15. The demagnetizing circuit of claim 14, comprising a resistor that is connected parallel to said capacitor.

16. The demagnetizing circuit of claim 14, wherein said capacitive circuit means include an additional capacitor interposed between the connection point of said third terminals of said first and second transistors and the connection point of said capacitor to said voltage divider.

17. The demagnetizing circuit of claim 16, comprising a rectifier circuit connected to said first and second supply voltage terminals is provided, whereby one output of said rectifier circuit is connected to said control terminal for supplying the rectified alternating supply voltage.

18. The demagnetizing circuit of claim 17, comprising a capacitor connected at its one end to said output of said rectifier circuit and thus is also connected to said control terminal and said capacitive circuit means and is connected at its other end to a ground.

19. The demagnetizing circuit of claim 18, wherein said capacitor comprises an electrolyte capacitor.

20. The demagnetizing circuit of claim 19, wherein said rectifier circuit and said capacitor are components of a voltage power supply to be connected to said demagnetizing circuit.

21. A demagnetizing circuit that receives an alternating supply voltage, and applies a demagnetizing current to a demagnetizing coil, comprising:
  first and second supply voltage terminals across which the alternating supply voltage is received;
  a first transistor and a second transistor arranged between said first supply voltage terminal and said second supply voltage terminal to receive the alternating supply voltage; and
  a control terminal connected to said first transistor and to said second transistor for controlling said first and second transistors via capacitive circuit means to which a rectified alternating supply voltage is applied.

* * * * *